United States Patent
Yabe et al.

(10) Patent No.: US 11,770,033 B2
(45) Date of Patent: Sep. 26, 2023

(54) ELECTRIC MOTOR, COMPRESSOR, FAN, AND REFRIGERATING AND AIR CONDITIONING APPARATUS

(71) Applicant: Mitsubishi Electric Corporation, Tokyo (JP)

(72) Inventors: Koji Yabe, Tokyo (JP); Takanori Watanabe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 504 days.

(21) Appl. No.: 17/057,017

(22) PCT Filed: Jun. 27, 2018

(86) PCT No.: PCT/JP2018/024271
§ 371 (c)(1),
(2) Date: Nov. 19, 2020

(87) PCT Pub. No.: WO2020/003390
PCT Pub. Date: Jan. 2, 2020

(65) Prior Publication Data
US 2021/0210998 A1    Jul. 8, 2021

(51) Int. Cl.
*H02K 1/14* (2006.01)
*H02K 1/16* (2006.01)
*H02K 16/04* (2006.01)

(52) U.S. Cl.
CPC .............. *H02K 1/148* (2013.01); *H02K 1/16* (2013.01); *H02K 16/04* (2013.01); *H02K 2213/03* (2013.01)

(58) Field of Classification Search
CPC .......... H02K 1/16; H02K 16/04; H02K 1/148; H02K 1/146; H02K 1/276; H02K 7/14; H02K 21/16; H02K 2213/03
(Continued)

(56) References Cited

U.S. PATENT DOCUMENTS

| 8,648,514 | B2 * | 2/2014 | Arita | H02K 21/44 310/112 |
| 9,444,317 | B2 * | 9/2016 | Shimizu | H02K 29/03 |

(Continued)

FOREIGN PATENT DOCUMENTS

| JP | H02-068645 A | 5/1990 |
| JP | H03-011946 A | 1/1991 |

(Continued)

OTHER PUBLICATIONS

International Search Report of the International Searching Authority dated Sep. 18, 2018 for the corresponding International application No. PCT/JP2018/024271 (and English translation).

*Primary Examiner* — Alex W Mok
(74) *Attorney, Agent, or Firm* — POSZ LAW GROUP, PLC (57) ABSTRACT

An electric motor includes a rotor and a stator. The stator includes a first stator core located on a first side in the axial direction, and a second stator core located on a second side. The minimum distance from a rotor core of the rotor to the first stator core in the radial direction is smaller than the minimum distance from the rotor core to the second stator core in the radial direction. Each tooth of the first stator core includes a tooth end portion. The tooth end portion includes a main body extending in the radial direction, and a first portion extending in the circumferential direction, and a second portion projecting from the first portion in the radial direction.

10 Claims, 9 Drawing Sheets

(58) Field of Classification Search
USPC .................................................. 310/216.001
See application file for complete search history.

(56) References Cited

U.S. PATENT DOCUMENTS

| | | | |
|---|---|---|---|
| 2014/0042853 A1* | 2/2014 | Shimizu | H02K 21/16 |
| | | | 310/156.01 |
| 2016/0248308 A1* | 8/2016 | Ogawa | H02K 21/26 |
| 2018/0106513 A1* | 4/2018 | Tsuchida | H02K 21/16 |

FOREIGN PATENT DOCUMENTS

| | | |
|---|---|---|
| JP | 2005-245146 A | 9/2005 |
| JP | 2013-027157 A | 2/2013 |
| JP | 2014-110660 A | 6/2014 |

\* cited by examiner

ELECTRIC MOTOR, COMPRESSOR, FAN, AND REFRIGERATING AND AIR CONDITIONING APPARATUS

CROSS REFERENCE TO RELATED APPLICATION

This application is a U.S. national stage application of International Patent Application No. PCT/JP2018/024271 filed on Jun. 27, 2018, the disclosure of which is incorporated herein by reference.

TECHNICAL FIELD

The present invention relates to an electric motor including a permanent magnet.

BACKGROUND

It is a common practice to use an electric motor including a rotor having a shaft supported only on one side in the axial direction. In such an electric motor, during driving of the electric motor, a bearing supporting the shaft may act as a fulcrum so that the shaft is bent. When the shaft is bent, since the position of the rotor moves in the radial direction, the rotor may come into contact with a stator. Setting an air gap on the free end side wide makes it possible to prevent the rotor from coming into contact with the stator. However, the wider the air gap, the weaker the magnetic force in the electric motor becomes. For that reason, an electric motor has been proposed in which an air gap on the free end side is set wide, and an air gap on the support side is set narrower than the air gap on the free end side (see, for example, patent reference 1).

PATENT REFERENCE

Patent Reference 1: Japanese Utility Model Application Publication No. H2-68645

Normally, windings are wound using a jig for positioning a stator core, and the inner circumferential surfaces of tooth end portions are used in positioning for inserting the windings into slots (that is, the regions between teeth). In the technique disclosed in patent reference 1, the shapes of slot openings defined by the regions between adjacent tooth end portions differ in the axial direction. It is, therefore, necessary to adjust or change the jig used, in accordance with the inner diameter of the stator core. As a result, the winding process is complicated.

It is an object of the present invention to prevent from weakening magnetic force in an electric motor and provide the electric motor on which it is easy to wind a winding.

SUMMARY

An electric motor according to the present invention includes a rotor including a shaft, a rotor core fixed to the shaft, and a permanent magnet fixed to the rotor core, and a stator located outside the rotor and including a first stator core and a second stator core, the first stator core being located on a first side in an axial direction and including a first tooth extending in a radial direction, the second stator core being located on a second side opposite to the first side in the axial direction and being adjacent to the first stator core in the axial direction, wherein the shaft is supported only on the first side, a minimum distance from the rotor core to the first stator core in the radial direction is shorter than a minimum distance from the rotor core to the second stator core in the radial direction, a minimum distance from a rotation center of the rotor to the first stator core in the radial direction is shorter than a minimum distance from the rotation center of the rotor to the second stator core in the radial direction, and the first tooth includes a main body extending in the radial direction, and a first tooth end portion including a first portion extending in a circumferential direction and a second portion projecting from the first portion in the radial direction, wherein the first stator core comprises a second tooth extending in a radial direction, the second tooth being adjacent to the first tooth in the circumferential direction, wherein the second tooth comprises: a main body extending in the radial direction; and a second tooth end portion including a first portion extending in the circumferential direction and a second portion projecting from the first portion in the radial direction, the second stator core comprises a third tooth extending in a radial direction, and a fourth tooth extending in a radial direction, the fourth tooth being adjacent to the third tooth in the circumferential direction, wherein the third tooth comprises: a main body extending in the radial direction; and a third tooth end portion extending in the circumferential direction, the fourth tooth comprises: a main body extending in the radial direction; and a fourth tooth end portion extending in the circumferential direction, and in a plane perpendicular to the axial direction, a shape of a first-side slot opening between the first portion of the first tooth end portion and the first portion of the second tooth end portion is the same as a shape of a second-side slot opening between the third tooth end portion and the fourth tooth end portion, wherein in the plane perpendicular to the axial direction, a radius defined from the rotation center to the first portion of the first tooth end portion is equal to a radius defined from the rotation center to the third tooth end portion.

According to the present invention, it is possible to prevent from weakening magnetic force in an electric motor and provide the electric motor on which it is easy to wind a winding.

DETAILED DESCRIPTION

Embodiment 1

Embodiments of the present invention will be described in detail below with reference to the drawings.

In an x-y-z orthogonal coordinate system illustrated in each drawing, the z-axis direction (z-axis) indicates a direction parallel to an axis Ax of an electric motor 1, the x-axis direction (x-axis) indicates a direction perpendicular to the z-axis direction (z-axis), and the y-axis direction (y-axis) indicates a direction perpendicular to both the z-axis direction and the x-axis direction. The axis Ax serves as the rotation center of a rotor 2. The direction parallel to the axis Ax will also be referred to as the "axial direction of the rotor 2" or simply as the "axial direction" hereinafter. The radial direction indicates a direction perpendicular to the axis Ax. The x-y plane indicates a plane perpendicular to the axial direction.

Figure 1:
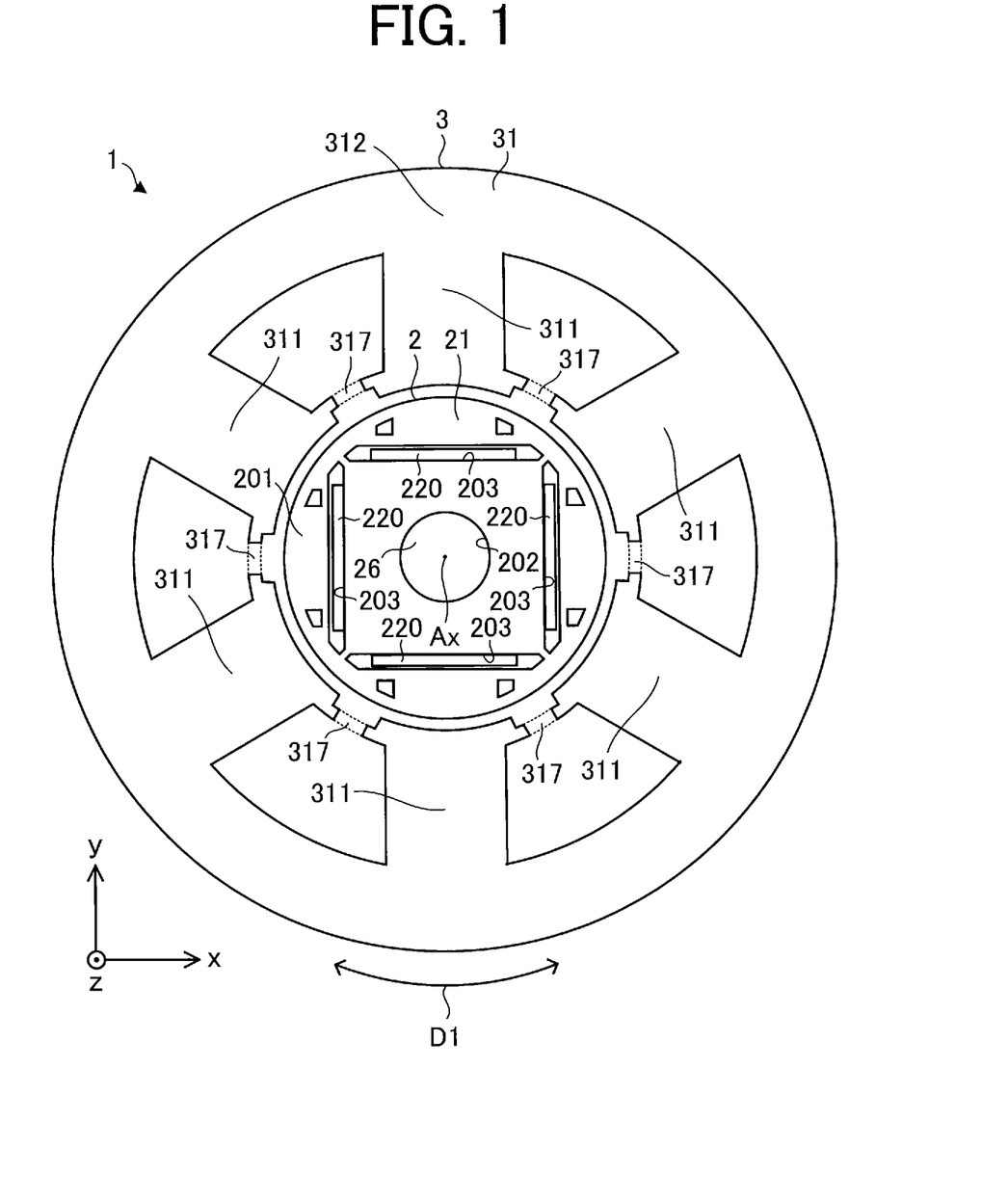
FIG. 1 is a plan view schematically illustrating a structure on a first side of an electric motor according to Embodiment 1 of the present invention.

FIG. 1 is a plan view schematically illustrating a structure on a first side of the electric motor 1 according to Embodiment 1 of the present invention. In the electric motor 1 illustrated in FIG. 1, a bearing 4 is omitted from a shaft 26. An arrow D1 indicates the circumferential direction of a stator 3 about the axis Ax. The arrow D1 also indicates the circumferential direction of the rotor 2 about the axis Ax. The circumferential directions of the rotor 2 and the stator 3 will also be simply referred to as the "circumferential direction" hereinafter.

Figure 2:
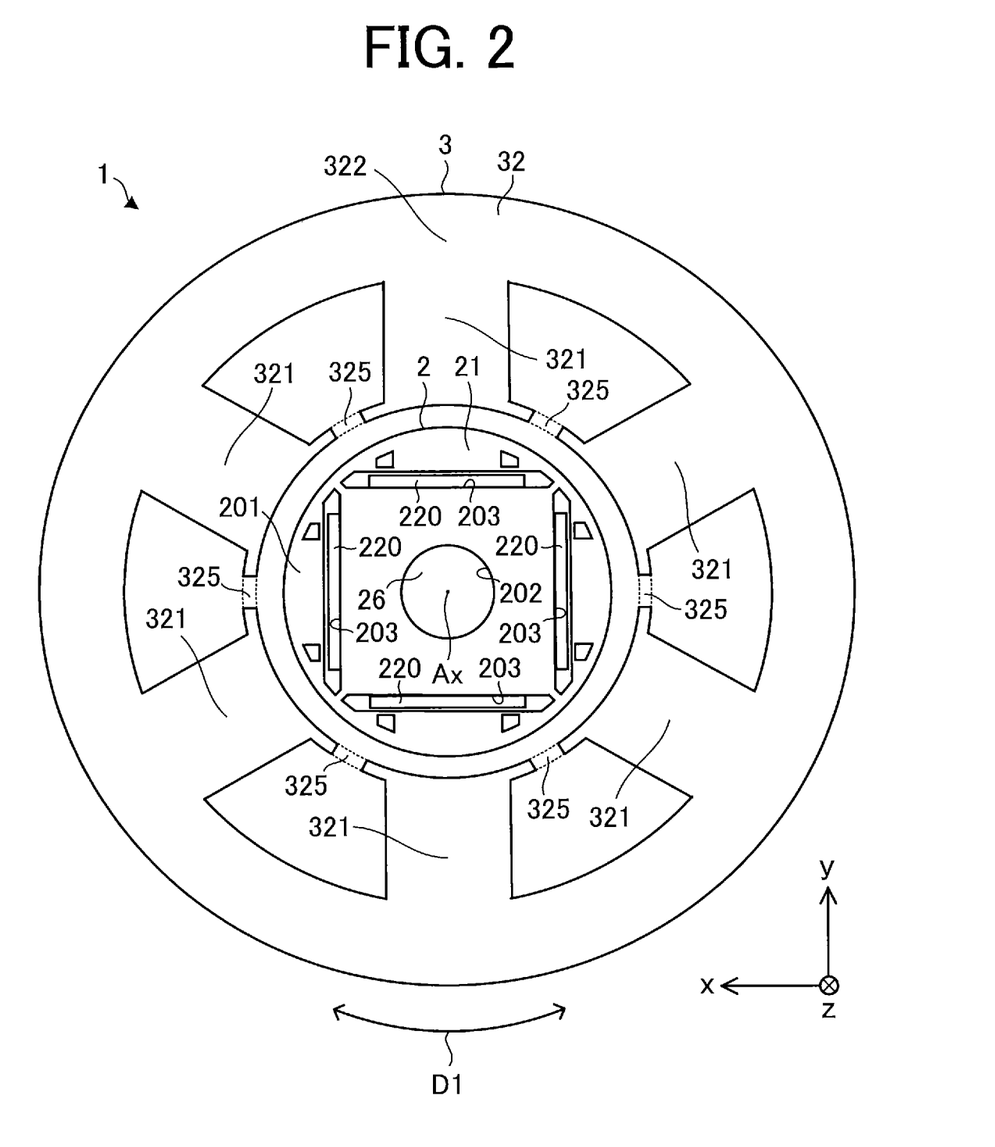
FIG. 2 is a plan view schematically illustrating a structure on a second side of the electric motor.

FIG. 2 is a plan view schematically illustrating a structure on a second side of the electric motor 1.

Figure 3:
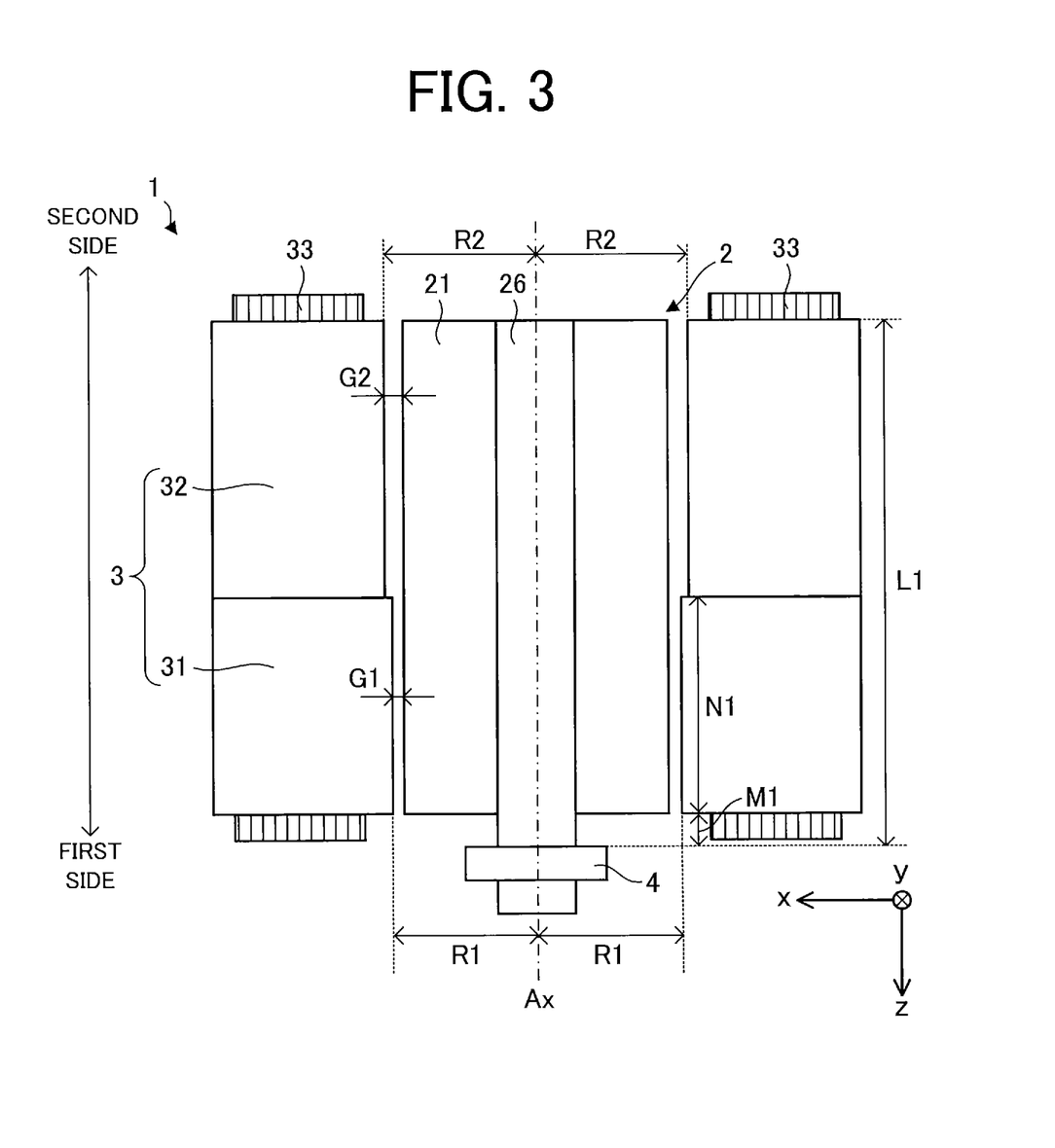
FIG. 3 is a sectional view schematically illustrating the structure of the electric motor.

FIG. 3 is a sectional view schematically illustrating the structure of the electric motor 1. In FIG. 3, the lower side (that is, the +z side) is defined as the first side, and the upper side (that is, the −z side) is defined as the second side. In other words, the second side is opposite to the first side in the axial direction. In this Embodiment, the first side will also be referred to as the bearing side, and the second side will also be referred to as the counter-bearing side.

The electric motor 1 includes the rotor 2, the stator 3, and the bearing 4. The electric motor 1 is designed as, for example, a permanent magnet synchronous motor (also called a brushless DC motor) such as an interior permanent magnet motor. The electric motor 1 is used as, for example, an electric motor in a highly efficient closed compressor used for a refrigeration cycle apparatus.

The rotor 2 is rotatably disposed inside the stator 3. The rotor 2 includes a rotor core 21, at least one permanent magnet 220, and the shaft 26. In the example illustrated in FIGS. 1 to 3, the axis of rotation of the rotor 2 coincides with the axis Ax. The rotor core 21 is fixed to the shaft 26. The bearing 4 supports the first side of the shaft 26 (FIG. 3).

The shaft 26 is inserted into a shaft hole 202 formed at the central portion of the rotor 2 in the x-y plane. The shaft 26 is fixed to the rotor core 21 (more specifically, the shaft hole 202) and rotatably supported only on the first side. More specifically, the shaft 26 is rotatably supported by the bearing 4 on the first side.

The rotor core 21 includes a plurality of electrical steel sheets 201 laminated in the axial direction, the shaft hole 202, and at least one magnet insertion hole 203. The rotor core 21 has a cylindrical shape.

The thickness of each of the plurality of electrical steel sheets 201 is, for example, 0.1 mm or more and 1 mm or less. Each electrical steel sheet 201 is formed into a predetermined shape by stamping. The shaft hole 202 and the magnet insertion holes 203 are formed in the plurality of electrical steel sheets 201. The shaft hole 202 is formed at the center of each of the electrical steel sheets 201, in the x-y plane.

In the example illustrated in FIGS. 1 and 2, the number of magnet insertion holes 203 is equal to that of magnetic poles on the rotor 2.

Each permanent magnet 220 is embedded in the rotor core 21. More specifically, the permanent magnets 220 are inserted into the magnet insertion holes 203 and fixed to the rotor core 21. The permanent magnet 220 is, for example, a rare-earth magnet. The permanent magnet 220, however, is not limited to the rare-earth magnet. The width of the permanent magnet 220 in the radial direction is smaller than that of the magnet insertion hole 203 in the radial direction.

The permanent magnets 220 are located to the inside in the radial direction within the magnet insertion holes 203, as illustrated in FIGS. 1 and 2. Therefore, voids are formed between the inner walls of the magnet insertion holes 203 and the outer surfaces of the permanent magnets 220 in the radial direction. Oil or a refrigerant may be present in these voids.

The stator 3 is located outside the rotor 2. The stator 3 includes a first stator core 31 and a second stator core 32, as illustrated in FIGS. 1 to 3. The stator 3 further includes windings 33 wound on the first stator core 31 and the second stator core 32, as illustrated in FIG. 3. In the stator 3 illustrated in FIGS. 1 and 2, the windings 33 are omitted from the first stator core 31 and the second stator core 32. Insulators, for example, are interposed between the windings 33, and the first stator core 31 and the second stator core 32. When the electric motor 1 is driven, a current is supplied to the windings 33, and the rotor 2 thus rotates.

The first stator core 31 is located on the first side in the axial direction, as illustrated in FIG. 3. The second stator core 32 is located on the second side. The second stator core 32 is adjacent to the first stator core 31 in the axial direction. In other words, the first stator core 31 is located on the first side of the stator 3, and the second stator core 32 is located on the second side of the stator 3.

The first stator core 31 is formed annularly. The first stator core 31 is formed of a plurality of electrical steel sheets laminated in the axial direction. Each of the plurality of electrical steel sheets is stamped into a predetermined shape.

The first stator core 31 includes at least one tooth 311 extending in the radial direction, and a yoke 312 extending in the circumferential direction, as illustrated in FIG. 1. In the example illustrated in FIG. 1, the first stator core 31 includes a plurality of teeth 311 (more specifically, six teeth 311).

Figure 4:
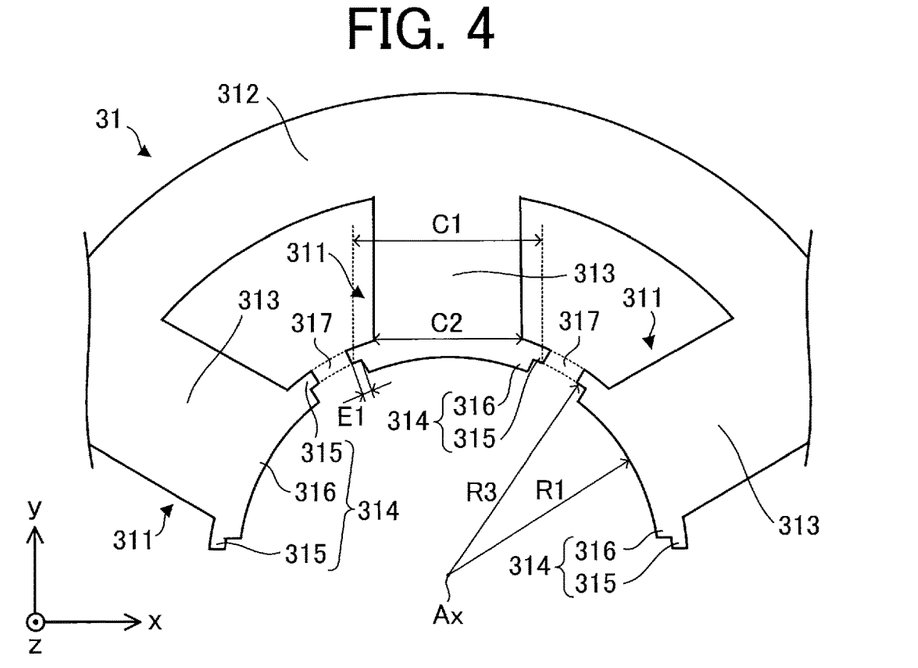
FIG. 4 is an enlarged view schematically illustrating a structure of a first stator core illustrated in FIG. 1.

FIG. 4 is an enlarged view schematically illustrating a structure of the first stator core 31 illustrated in FIG. 1. FIG. 4 illustrates a partial structure of the first stator core 31.

Each tooth 311 of the first stator core 31 includes a main body 313 extending in the radial direction, and a tooth end portion 314 extending in the circumferential direction.

The main body 313 extends from the yoke 312 in the radial direction. The tooth end portion 314 includes a first portion 315 extending in the circumferential direction, and a second portion 316 projecting from the first portion 315 in the radial direction. The tooth end portion 314 (more specifically, the second portion 316) faces the rotor core 21. The first portion 315 projects from the both sides of the main body 313 in the circumferential direction. In the example illustrated in FIGS. 1 and 4, the plurality of teeth 311 have the same shape.

The surface (to be also referred to as the inner circumferential surface) of the first portion 315 facing the rotor core 21 has an arc shape with a radius R3 in the x-y plane. The radius R3 will also be referred to as a distance R3 hereinafter. The surface (to be also referred to as the inner circumferential surface) of the second portion 316 facing the rotor core 21 has an arc shape with a radius R1 in the x-y plane. The radius R1 will also be referred to as a distance R1.

In the example illustrated in FIG. 4, the radius of curvature of the inner circumferential surface of the first portion 315 is uniform, and the radius of curvature of the inner circumferential surface of the second portion 316 is also uniform.

In the x-y plane, the length E1 of the inner circumferential surface of the first portion 315 of the tooth end portion 314 is larger than 0.4 mm. This makes it easy to fix a jig to the inner circumferential surface of the first portion 315 of the tooth end portion 314 in the winding process.

In the x-y plane, the distance C1 between the both ends of the inner circumferential surface of the first portion 315 of the tooth end portion 314 in a direction perpendicular to the radial direction is larger than the minimum width C2 of the main body 313 of the tooth 311 in the direction perpendicular to the radial direction. In other words, the first portion 315 projects from the both sides of the main body 313 in the direction perpendicular to the radial direction. This makes it possible to increase the effective magnetic flux from the permanent magnet 220. This means that a large amount of magnetic flux from the rotor 2 can be flowed into the tooth 311.

The second stator core 32 is formed annularly. The second stator core 32 is formed of a plurality of electrical steel sheets laminated in the axial direction. Each of the plurality of electrical steel sheets is stamped into a predetermined shape.

The second stator core 32 includes at least one tooth 321 extending in the radial direction, and a yoke 322 extending in the circumferential direction, as illustrated in FIG. 2. In the example illustrated in FIG. 2, the second stator core 32 includes a plurality of teeth 321 (more specifically, six teeth 321). In the example illustrated in FIG. 2, in the x-y plane, the distance from the axis Ax to the tooth 321 of the second stator core 32 is uniform in the circumferential direction.

Figure 5:
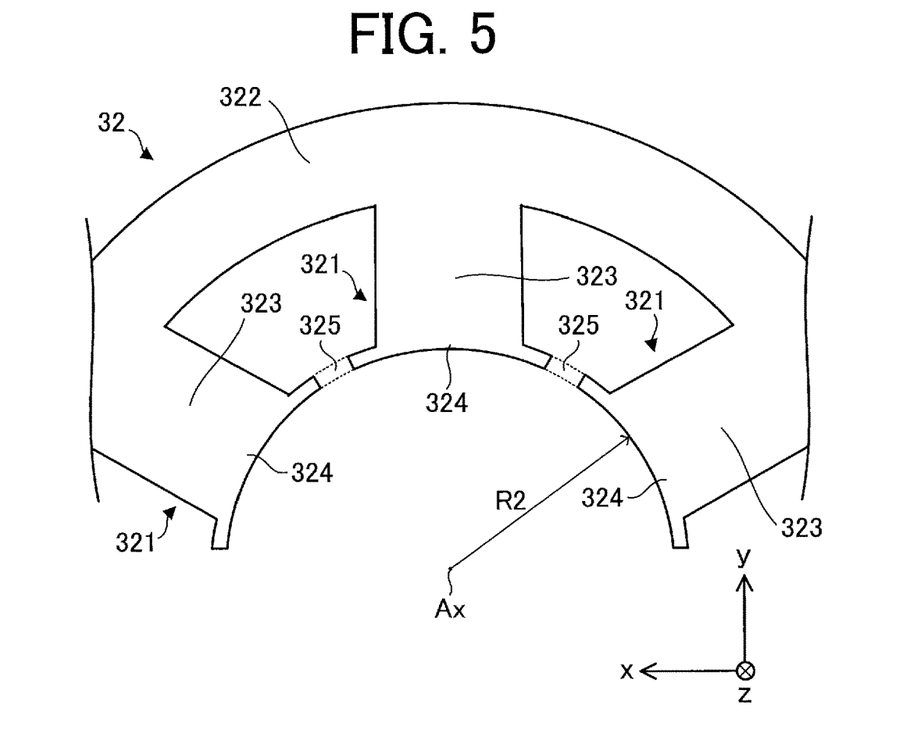
FIG. 5 is an enlarged view schematically illustrating a structure of a second stator core illustrated in FIG. 2.

FIG. 5 is an enlarged view schematically illustrating a structure of the second stator core 32 illustrated in FIG. 2. FIG. 5 illustrates a structure of part of the second stator core 32.

Each tooth 321 of the second stator core 32 includes a main body 323 extending in the radial direction, and a tooth end portion 324 extending in the circumferential direction. The main body 323 extends from the yoke 322 in the radial direction. The tooth end portion 324 extends in the circumferential direction.

The tooth end portion 324 faces the rotor core 21. The surface (to be also referred to as the inner circumferential surface) of the tooth end portion 324 facing the rotor core 21 has an arc shape with a radius R2 in the x-y plane. The radius R2 will also be referred to as a distance R2. In the example illustrated in FIG. 5, the radius of curvature of the inner circumferential surface of the tooth end portion 324 is uniform. In the example illustrated in FIGS. 2 and 5, the plurality of teeth 321 have the same shape.

The first stator core 31 further includes at least one slot opening 317. Each slot opening 317 is defined by a region surrounded by a broken line in FIG. 1. In the example illustrated in FIG. 1, the first stator core 31 includes a plurality of slot openings 317 (more specifically, six slot openings 317). The slot openings 317 will also be referred to as first-side slot openings.

The central tooth among the three teeth 311 shown in FIG. 4 is defined as a "first tooth 311," and the left tooth 311 or the right tooth 311 adjacent to the first tooth 311 in the circumferential direction is defined as a "second tooth 311." In this case, the tooth end portion 314 of the first tooth 311 is defined as a "first tooth end portion 314," and the tooth end portion 314 of the second tooth 311 is defined as a "second tooth end portion 314." This means that the second tooth end portion 314 is adjacent to the first tooth end portion 314 in the circumferential direction.

Each slot opening 317 is defined by the space between the first portion 315 of the first tooth end portion 314 and the first portion 315 of the second tooth end portion 314 in the x-y plane.

The second stator core 32 further includes at least one slot opening 325. Each slot opening 325 is defined by a region surrounded by a broken line in FIG. 2. In the example illustrated in FIG. 2, the second stator core 32 includes a plurality of slot openings 325 (more specifically, six slot openings 325). The slot openings 325 will also be referred to as second-side slot openings.

The central tooth among the three teeth 321 shown in FIG. 5 is defined as a "third tooth 321," and the left tooth 321 or the right tooth 321 adjacent to the third tooth 321 in the circumferential direction is defined as a "fourth tooth 321." In this case, the tooth end portion 324 of the third tooth 321 is defined as a "third tooth end portion 324," and the tooth end portion 324 of the fourth tooth 321 is defined as a "fourth tooth end portion 324." This means that the fourth tooth end portion 324 is adjacent to the third tooth end portion 324 in the circumferential direction.

Each slot opening 325 is defined by the space between the third tooth end portion 324 and the fourth tooth end portion 324 in the x-y plane.

In the x-y plane, the shape of the slot opening 317 (that is, the first-side slot opening) is the same as that of the slot opening 325 (that is, the second-side slot opening). In other words, in the x-y plane, the dimensions of the slot opening 317 in the radial and circumferential directions are equal to the dimensions of the slot opening 325 in the radial and circumferential directions. This means that in the x-y plane, the area of the slot opening 317 is equal to that of the slot opening 325. The shapes of the slot openings 317 and 325 in the x-y plane are uniform in the axial direction. This makes it possible to easily wind the windings 33.

In the x-y plane, the position of the inner circumferential surface of the first portion 315 of the tooth end portion 314 coincides with the position of the inner circumferential surface of the tooth end portion 324. In other words, in the x-y plane, the curvature of the inner circumferential surface of the first portion 315 of the tooth end portion 314 is equal to the curvature of the inner circumferential surface of the tooth end portion 324. Therefore, in the x-y plane, the radius R3 defined from the rotation center of the rotor 2 to the first portion 315 of the tooth end portion 314 is equal to the radius R2 defined from the rotation center of the rotor 2 to the tooth end portion 324. The inner circumferential surface of the first portion 315, the inner circumferential surface of the second portion 316, and the inner circumferential surface of the tooth end portion 324 desirably form concentric circles.

The distance R1 is the minimum distance from the rotation center of the rotor 2 to the first stator core 31 in the radial direction when the rotation center of the rotor 2 coincides with the center of the stator 3 in the x-y plane. The distance R2 is the minimum distance from the rotation center of the rotor 2 to the second stator core 32 in the radial direction when the rotation center of the rotor 2 coincides with the center of the stator 3 in the x-y plane. The distance R1 is smaller than the distance R2.

A distance L1 is the minimum distance from the end of the second stator core 32 on the second side to the bearing 4 in the axial direction. The distance L1 also is the minimum distance from the end of the rotor core 21 on the second side to the bearing 4 in the axial direction. A distance M1 is the minimum distance from the first stator core 31 to the bearing 4. A thickness N1 is the thickness of the first stator core 31 in the axial direction.

A distance G1 is the minimum distance from the rotor core 21 to the first stator core 31 in the radial direction when the rotation center of the rotor 2 coincides with the center of the stator 3 in the x-y plane. In other words, the distance G1 is the minimum distance of the air gap between the rotor core 21 and the first stator core 31.

A distance G2 is the minimum distance from the rotor core 21 to the second stator core 32 in the radial direction when the rotation center of the rotor 2 coincides with the center of the stator 3 in the x-y plane. In other words, the distance G2 is the minimum distance of the air gap between the rotor core 21 and the second stator core 32.

When the rotation center of the rotor 2 coincides with the center of the stator 3 in the x-y plane, the rotation center of the rotor 2 coincides with the axis Ax. This means that the axis Ax also is a line representing the center of the stator 3. In this case, the electric motor 1 satisfies G2>G1.

As illustrated in FIG. 3, when the shaft 26 is tilted in the z-x plane, the maximum moving distance of the rotor core 21 in the radial direction is approximated by $G2\times(M1+N1)/L1$ at the end of the first stator core 31 in the −z-direction, that is, the end of the first stator core 31 on the second side. Therefore, the air gap between the first stator core 31 and the rotor 2 needs to be set wider than $G2\times(M1+N1)/L1$ at the end of the first stator core 31 in the −z-direction. The distance G1 needs to be set larger than $G2\times(M1+N1)/L1$.

In the example illustrated in FIG. 3, the electric motor 1 satisfies $G1>G2\times(M1+N1)/L1$ (that is, $G2\times(M1+N1)/L1<G1<G2$). This makes it possible to prevent the rotor 2 (more specifically, the rotor core 21) from coming into contact with the first stator core 31 and the second stator core 32 while keeping the air gap narrow when the shaft 26 is tilted.

Figure 6:
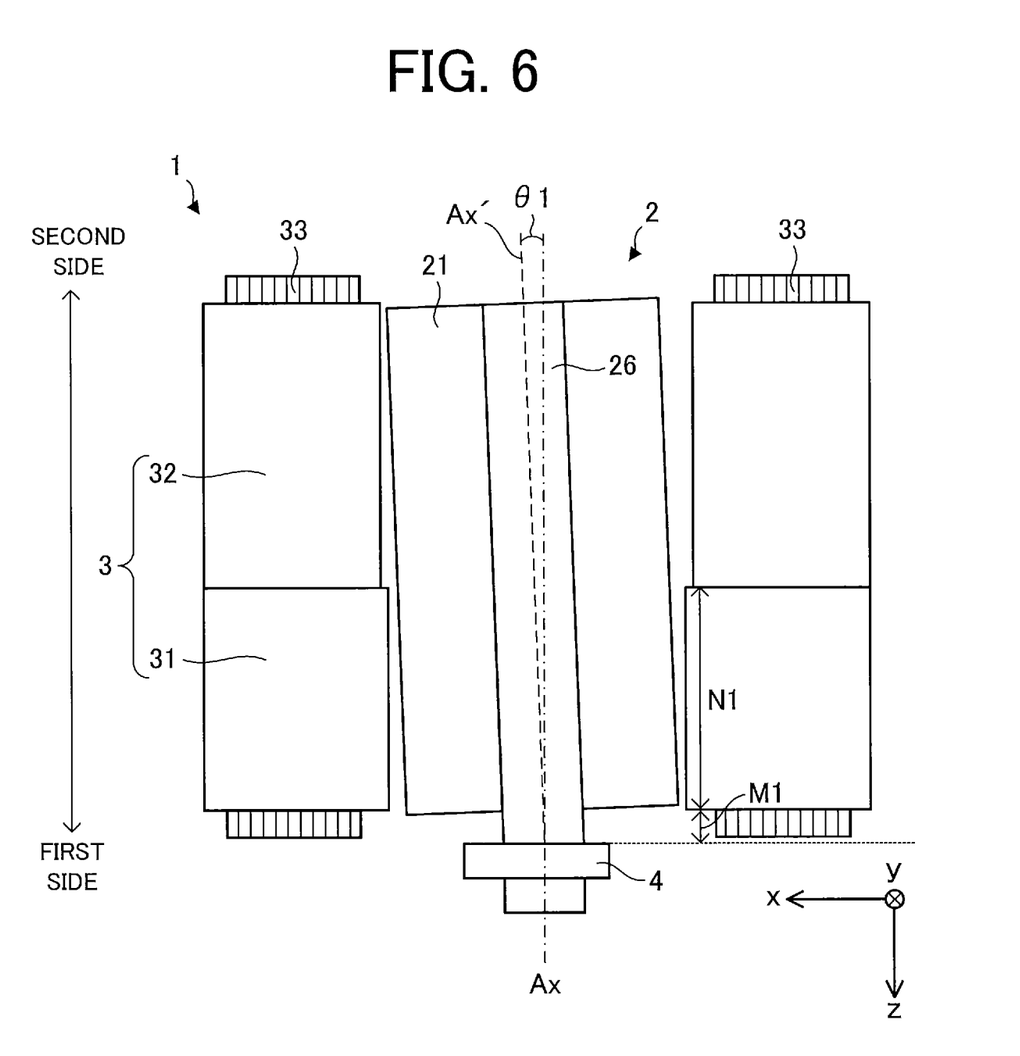
FIG. 6 is a diagram illustrating an exemplary state of a rotor during driving of the electric motor.

FIG. 6 is a diagram illustrating an exemplary state of the rotor 2 during driving of the electric motor 1. An axis Ax' represents the center of the shaft 26 illustrated in FIG. 6. In the example illustrated in FIG. 6, the axis Ax' serving as the rotation center of the rotor 2 is shifted from the initially set axis Ax.

A tilt θ1 is the maximum tilt of the shaft 26 in a plane parallel to the axial direction, that is, the z-x plane. In other words, the tilt θ1 is the maximum tilt of the shaft 26 from the axis Ax in the z-x plane. This means that the tilt θ1 is the tilt when the rotor 2 (more specifically, the rotor core 21) is in contact with the stator 3.

When the tilt of the shaft 26 is θ1 in the z-x plane, the moving distance of the rotor core 21 in the radial direction is given by $L1\times\sin\theta1$ at the end of the rotor core 21 on the second side. It is, therefore, necessary to set the distance G2 (FIG. 3) larger than $L1\times\sin\theta1$. Accordingly, the electric motor 1 satisfies $G2>L1\times\sin\theta1$ (that is, $L1\times\sin\theta1<G1<G2$). This makes it possible to prevent the rotor 2 (more specifically, the rotor core 21) from coming into contact with the second stator core 32 while keeping the air gap narrow.

When, furthermore, the maximum tilt of the shaft 26 is θ1 in the z-x plane, the moving distance of the rotor core 21 in the radial direction is given by $(M1+N1)\times\sin\theta1$ at the end of the first stator core 31 in the −z-direction, that is, the end of the first stator core 31 on the second side. It is, therefore, necessary to set the distance G1 larger than $(M1+N1)\times\sin\theta1$. Accordingly, the electric motor 1 satisfies $G1>(M1+N1)\times\sin\theta1$ (that is, $(M1+N1)\times\sin\theta1<G1<G2$). This makes it possible to prevent the rotor 2 (more specifically, the rotor core 21) from coming into contact with the first stator core 31 and the second stator core 32 while keeping the air gap narrow when the shaft 26 is tilted.

The effects of the electric motor 1 according to this Embodiment will be described below.

An air gap between a stator and a rotor is generally designed to be narrow. This makes it possible to keep the magnetic resistance in an electric motor low and to prevent a reduction in magnetic force. When, however, a shaft of the rotor is rotatably supported only on one side in the axial direction, the rotor may be subjected to a magnetic force in the radial direction, so the shaft of the rotor may be bent. Therefore, when the shaft of the rotor is rotatably supported only on one side in the axial direction, the air gap between the stator and the rotor is desirably designed to be wide. However, the wider the air gap, the weaker the magnetic force.

In an electric motor using permanent magnets, since the magnetic force of the permanent magnets in the radial direction is strong, a shaft of a rotor is readily bent. Therefore, when the shaft of the rotor is rotatably supported only by a bearing on one side in the axial direction, the bearing side of the shaft may act as a fulcrum so that the shaft is bent. In this case, an air gap on the counter-bearing side is narrower than an air gap on the bearing side. In the conventional electric motor, therefore, to prevent the counter-bearing side of a rotor core from coming into contact with a stator, the outer diameter of the rotor core needs to be set small. However, setting the outer diameter of the rotor core small generates a portion having a wide air gap, and thus reduces the magnetic force.

In the electric motor 1 according to this Embodiment, the distance G1 is smaller than the distance G2, as illustrated in FIG. 3. This makes it possible to appropriately set the air gap between the stator 3 and the rotor 2 in consideration of bending of the shaft 26. In other words, even if the shaft 26 of the rotor 2 is bent, the air gap on the second side (for example, the distance G2) is kept narrow without bringing the second side of the rotor 2 into contact with the second stator core 32. Since the distance G1 is smaller than the distance G2, the air gap on the first side (for example, the distance G1) can also be kept narrow. As a result, a reduction in magnetic force in the electric motor 1 can be prevented.

The outer diameter of the rotor core 21 is uniform in the circumferential direction. Hence, setting the inner diameter of the first stator core 31 and the inner diameter of the second stator core 32 makes it possible to easily adjust the sizes of the two types of air gaps (that is, the distances G1 and G2). In the electric motor 1, since the distance R1 is smaller than the distance R2, the distance G1 can be set smaller than the distance G2.

In the electric motor 1 using the permanent magnets 220, since the magnetic force of the permanent magnets 220 in the radial direction is strong, the shaft 26 of the rotor 2 is readily bent. The electric motor 1 satisfies $G1>G2\times(M1+N1)/L1$ (that is, $G2\times(M1+N1)/L1<G1<G2$). This makes it possible to prevent the rotor 2 (more specifically, the rotor core 21) from coming into contact with the first stator core 31 and the second stator core 32 while keeping the air gap narrow when the shaft 26 is tilted.

When the tilt of the shaft 26 is θ1 in the z-x plane, the moving distance of the rotor core 21 in the radial direction is given by $L1\times\sin\theta1$ at the end of the rotor core 21 on the second side. The electric motor 1 satisfies $G2>L1\times\sin\theta1$ (that is, $L1\times\sin\theta1<G1<G2$). This makes it possible to prevent the rotor 2 (more specifically, the rotor core 21) from coming into contact with the second stator core 32 while keeping the air gap narrow.

Electrical steel sheets to form a stator core are normally formed by pressing. If the first stator core 31 and the second stator core 32 have much difference in shape, dies for machining electrical steel sheets of each of the first stator core 31 and the second stator core 32 are required, and this incurs a higher die cost. In contrast to this, in the electric motor 1 according to this Embodiment, since the shape of the tooth end portion 314 need only be changed to make the relationship between the distances G1 and G2 satisfy G1<G2, the machining and die costs can be kept down.

Normally, windings are wound using a jig for positioning a stator core, and the inner circumferential surfaces of tooth end portions are used in positioning for inserting the windings into slots (that is, the regions between teeth). When the inner diameter of the stator core varies in the axial direction, the windings are more likely to get stuck on the stator core. When the windings get stuck on the stator core, the quality of the windings degrades. It is, therefore, necessary to adjust or change the jig used, in accordance with the inner diameter of the stator core. In this case, the winding process is complicated, and this incurs a higher manufacturing cost.

When the shapes of slot openings differ in the axial direction, it is necessary to adjust or change the jig used, in accordance with the shape of each slot opening. As a result, the winding process is complicated, and this incurs a higher manufacturing cost. In the electric motor 1 according to this Embodiment, the distance R1 is smaller than the distance R2, and the shape of the slot opening 317 (that is, the first-side slot opening) is the same as that of the slot opening 325 (that is, the second-side slot opening) in the x-y plane. This makes it possible to reduce the number of adjustments or changes of the jig used in the winding process, while making the relationship between the distances G1 and G2 satisfy G1<G2, and to easily wind the windings 33. As a result, the manufacturing cost can be kept down.

The shapes of the slot openings 317 and 325 in the x-y plane are uniform in the axial direction. This makes it possible to prevent the jig from getting stuck on the first stator core 31 and the second stator core 32, and to prevent deterioration of the arrangement of the electrical steel sheets forming the first stator core 31 and the second stator core 32.

In the x-y plane, the position of the inner circumferential surface of the first portion 315 of the tooth end portion 314 coincides with the position of the inner circumferential surface of the tooth end portion 324. In other words, the curvature of the inner circumferential surface of the first portion 315 of the tooth end portion 314 is equal to the curvature of the inner circumferential surface of the tooth end portion 324. Accordingly, in the x-y plane, the radius R3 defined from the rotation center of the rotor 2 to the first portion 315 of the tooth end portion 314 is equal to the radius R2 defined from the rotation center of the rotor 2 to the tooth end portion 324. This makes it possible to reduce the number of adjustments or changes of the jig used and to easily wind the windings 33, as described above. As a result, the manufacturing cost can be kept down.

Normally, in the processes of manufacturing an electric motor, an air gap between a rotor and a stator is controlled using a gap gauge. In the x-y plane, when the position of the inner circumferential surface of the first portion 315 of the tooth end portion 314 coincides with the position of the inner circumferential surface of the tooth end portion 324, air gap control using a gap gauge is facilitated. In other words, when the curvature of the inner circumferential surface of the first portion 315 of the tooth end portion 314 is equal to the curvature of the inner circumferential surface of the tooth end portion 324, air gap control using a gap gauge is facilitated. As a result, the accuracy of the air gap between the rotor 2 and the stator 3 can be improved.

Generally, windings are desirably inserted from the side on which the inner diameter of a stator core is relatively small. Accordingly, in the processes of manufacturing the electric motor 1 according to this Embodiment, the windings 33 are desirably inserted into the stator 3 from the first side. When the windings 33 are inserted into the stator 3 from the second side, they are more likely to get stuck on the second portions 316 projecting in the radial direction. Therefore, inserting the windings 33 into the stator 3 from the first side makes it possible to easily wind the windings.

The larger the length of the second portion 316 of the tooth end portion 314 in the circumferential direction, the more readily the magnetic flux from the rotor 2 flows into the tooth 311. The larger the length of the second portion 316 in the circumferential direction, however, the smaller the length E1 of the inner circumferential surface of the first portion 315. When the length E1 of the inner circumferential surface of the first portion 315 is small, the jig is unstable in the winding process. In the x-y plane, the length E1 of the inner circumferential surface of the first portion 315 of the tooth end portion 314 is larger than 0.4 mm. This makes it easy to fix the jig to the inner circumferential surface of the first portion 315 of the tooth end portion 314 in the winding process.

The ends of the first portions 315 in the circumferential direction are chamfered with a radius of about 0.2 mm to prevent corner chipping. In this case, since the length E1 of the inner circumferential surface of the first portion 315 is larger than 0.4 mm, an inner circumferential surface contactable with the jig in the circumferential direction can be formed in the first portion 315, and the inner circumferential surface of the first portion 315 can be brought into contact with the jig in the winding process. Therefore, the inner circumferential surface of the first portion 315 and the inner circumferential surface of the tooth end portion 324 desirably have the same curvature in the x-y plane.

In the x-y plane, the distance C1 between the two ends of the inner circumferential surface of the first portion 315 of the tooth end portion 314 in a direction perpendicular to the radial direction is larger than the minimum width C2 of the main body 313 of the tooth 311 in the direction perpendicular to the radial direction. This makes it possible to increase the effective magnetic flux from the permanent magnet 220. This means that a large amount of magnetic flux from the rotor 2 can be flowed into the tooth 311. In this case, the tooth end portion 314 includes a second portion 316 projecting from the first portion 315 in the radial direction. This makes it possible to set the air gap between the first stator core 31 and the rotor 2 narrow in regions where the magnetic flux from the rotor 2 more readily flows into the tooth 311, and the magnetic flux from the rotor 2 can be effectively flowed into the first stator core 31.

When the permanent magnets 220 are rare-earth magnets, since the magnetic force of the rotor 2 is considerably strong, a great force acts on the shaft 26. In this case, in the electric motor 1, the shaft 26 is supported only by the bearing 4 on one side in the axial direction, and is thus readily bent. In the conventional electric motor, therefore, to prevent the rotor core from coming into contact with the stator, the air gap between the rotor core and the stator needs to be set wide. However, setting the air gap wide reduces the magnetic force. In this Embodiment, since the electric motor 1 has the above-mentioned structure, even when rare-earth magnets are used as the permanent magnets, the air gap between the rotor 2 and the stator 3 can be kept narrow while preventing the rotor 2 from coming into contact with the first stator core 31 and the second stator core 32. This makes it possible to prevent a reduction in magnetic force in the electric motor 1, and to easily wind the windings 33 in the winding process.

Modification 1.

Figure 7:
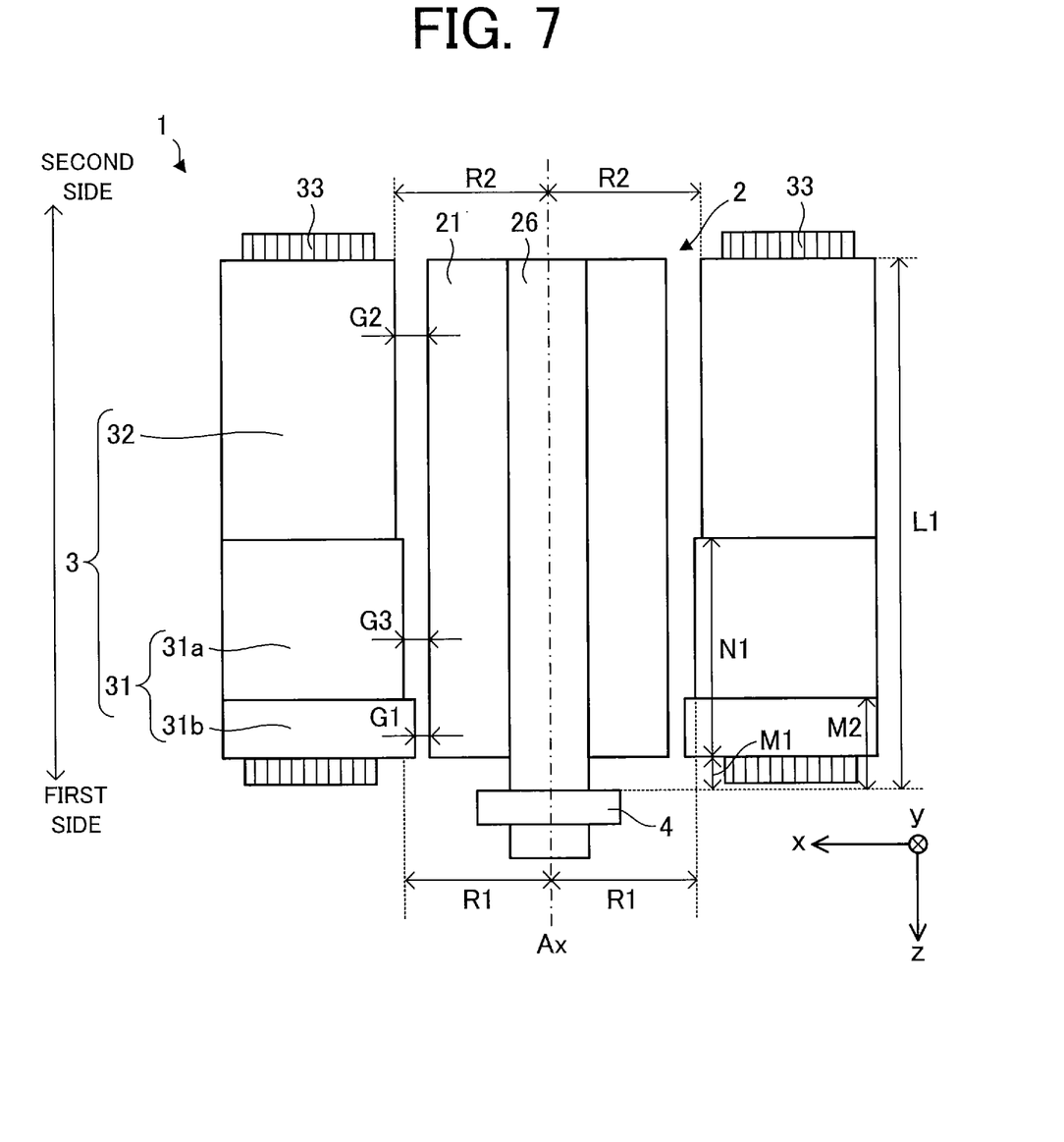
FIG. 7 is a diagram illustrating another example of the structure of the first stator core.

FIG. 7 is a diagram illustrating another example of the structure of the first stator core 31.

In Modification 1, the first stator core 31 includes a first core portion 31a and a second core portion 31b. Structures other than the first stator core 31 are the same as in the above-described Embodiment 1.

In Modification 1, a distance G1 is the minimum distance from the rotor core 21 to the second core portion 31b in the radial direction when the rotation center of the rotor 2 coincides with the center of the stator 3 in the x-y plane. In Modification 1, a distance G3 is the minimum distance from the rotor core 21 to the first core portion 31a in the radial direction when the rotation center of the rotor 2 coincides with the center of the stator 3 in the x-y plane. The distance G1 is smaller than the distance G3. Accordingly, the relationship among the distances G1, G2, and G3 satisfies G1<G2 and G1<G3. With this arrangement, since the air gap is narrow on the first side of the electric motor 1, the magnetic flux from the rotor 2 can be readily flowed into the first stator core 31. As a result, the efficiency of the electric motor 1 can be enhanced.

Since the air gap is wide on the second side of the electric motor 1, the rotor 2 can be prevented from coming into contact with the second stator core 32 when the shaft 26 is tilted. In other words, since the electric motor 1 satisfies G1<G2 and G1<G3, the efficiency of the electric motor 1 can be enhanced while preventing the rotor 2 from coming into contact with the second stator core 32.

A distance M2 is the minimum distance from the end of the second core portion 31b on the second side to the bearing 4 in the axial direction. In this case, the electric motor 1 satisfies G3×M2/(M1+N1)<G1<G3. This makes it possible to prevent the rotor 2 from coming into contact with the first stator core 31 and the second stator core 32 while keeping the air gap narrow when the shaft 26 is tilted.

In Modification 1, as in the example illustrated in FIG. 6, when the tilt of the shaft 26 is θ1 in the z-x plane, the moving distance of the rotor core 21 in the radial direction is given by M2×sin θ1 at the end of the second core portion 31b on the second side. As described above, the tilt θ1 is the tilt when the rotor 2 (more specifically, the rotor core 21) is in contact with the stator 3. Accordingly, the electric motor 1 satisfies M2×sin θ1<G1<G3. This makes it possible to prevent the rotor core 21 from coming into contact with the first stator core 31.

Modification 2.

Figure 8:
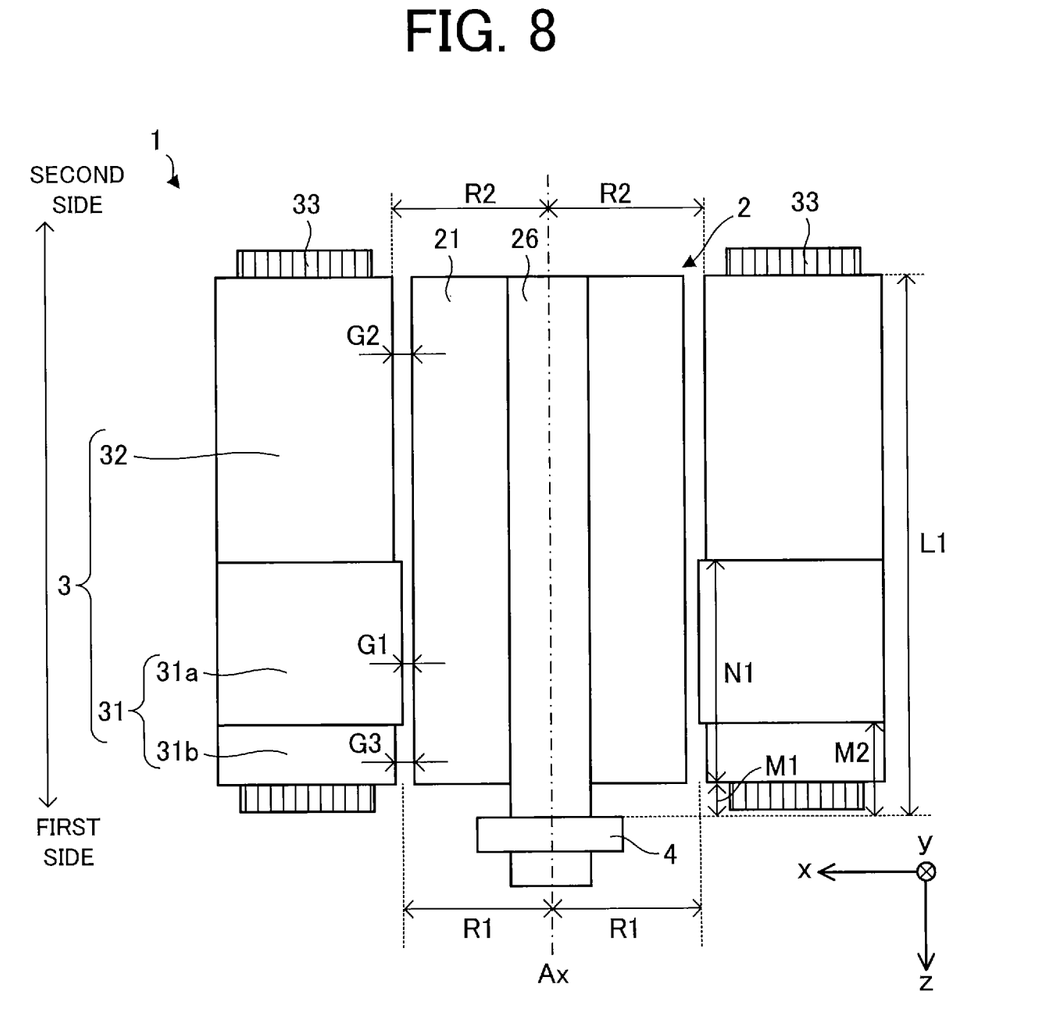
FIG. 8 is a diagram illustrating still another example of the structure of the first stator core.

FIG. 8 is a diagram illustrating still another example of the structure of the first stator core 31.

In Modification 2, the first stator core 31 includes a first core portion 31a and a second core portion 31b. Structures other than the first stator core 31 are the same as in the above-described Embodiment 1.

In Modification 2, a distance G1 is the minimum distance from the rotor core 21 to the first core portion 31a in the radial direction when the rotation center of the rotor 2 coincides with the center of the stator 3 in the x-y plane. In Modification 2, a distance G3 is the minimum distance from the rotor core 21 to the second core portion 31b in the radial direction when the rotation center of the rotor 2 coincides with the center of the stator 3 in the x-y plane. The distance G1 is smaller than the distance G3. Accordingly, the relationship among the distances G1, G2, and G3 satisfies G1<G2 and G1<G3. With this arrangement, since the air gap is narrow on the first side of the electric motor 1, the magnetic flux from the rotor 2 can be readily flowed into the first stator core 31. As a result, the efficiency of the electric motor 1 can be enhanced.

Since the air gap is wide on the second side of the electric motor 1, the rotor 2 can be prevented from coming into contact with the second stator core 32 when the shaft 26 is tilted. In other words, since the electric motor 1 satisfies G1<G2 and G1<G3, the efficiency of the electric motor 1 can be enhanced while preventing the rotor 2 from coming into contact with the second stator core 32.

The electric motors 1 exemplified in Modifications 1 and 2 can obtain the same advantages as those described in Embodiment 1. In other words, as described in Modifications 1 and 2, the electric motor 1 need only satisfy G1<G2, and the structure of the air gap between the first stator core 31 and the rotor 2 is not limited to that in Embodiment 1.

Embodiment 2

A compressor 6 according to Embodiment 2 of the present invention will be described below.

Figure 9:
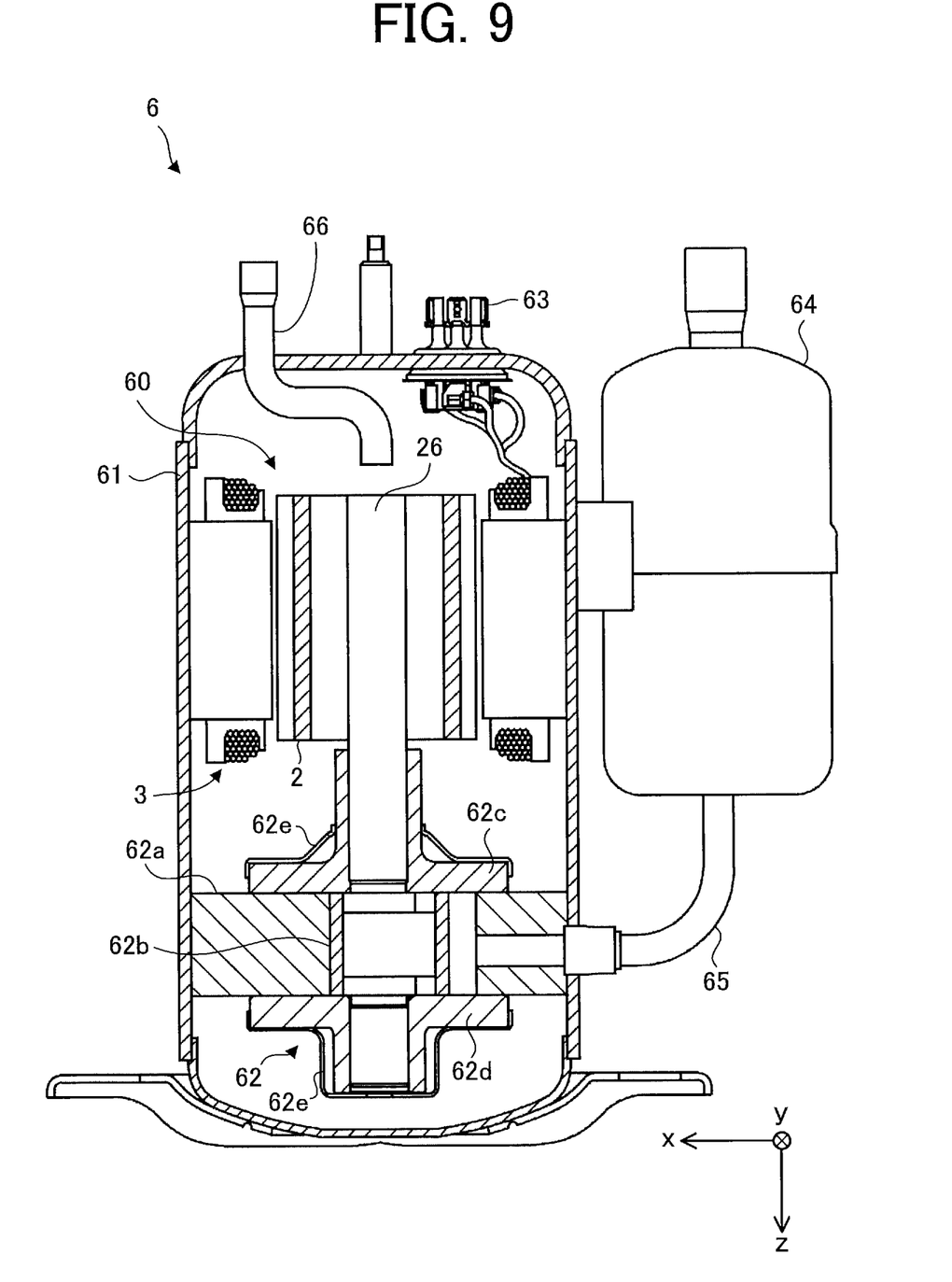
FIG. 9 is a sectional view schematically illustrating a structure of a compressor according to Embodiment 2.

FIG. 9 is a sectional view schematically illustrating a structure of the compressor 6 according to Embodiment 2.

The compressor 6 includes an electric motor 60 as an electric power element, a sealed or closed container 61 as a housing, and a compression mechanism 62 as a compression element. In this Embodiment, the compressor 6 is implemented as a rotary compressor. The compressor 6, however, is not limited to the rotary compressor.

The electric motor 60 is identical to the electric motor 1 according to Embodiment 1. In this Embodiment, the electric motor 60 is an interior permanent magnet motor, but it is not limited to this.

The closed container 61 covers the electric motor 60 and the compression mechanism 62. Freezer oil to lubricate the sliding portions of the compression mechanism 62 is stored at the bottom of the closed container 61.

The compressor 6 further includes a glass terminal 63 fixed to the closed container 61, an accumulator 64, a suction pipe 65, and a discharge pipe 66.

The compression mechanism 62 includes a cylinder 62a, a piston 62b, an upper frame 62c (first frame), a lower frame 62d (second frame), and a plurality of mufflers 62e respectively mounted on the upper frame 62c and the lower frame 62d. The compression mechanism 62 further includes a vane to separate the cylinder 62a into the suction side and the compression side. The compression mechanism 62 is driven by the electric motor 60.

The electric motor 60 is fixed in the closed container 61 by press fitting or shrink fitting. The stator 3 may be directly mounted in the closed container 61 by welding instead of press fitting and shrink fitting.

Power is supplied to the windings of the stator 3 of the electric motor 60 via the glass terminal 63.

The rotor (more specifically, one end side of the shaft 26) of the electric motor 60 is rotatably supported by a bearing provided on each of the upper frame 62c and the lower frame 62d.

The shaft 26 is inserted in the piston 62b. The shaft 26 is rotatably inserted in the upper frame 62c and the lower frame 62d. The upper frame 62c and the lower frame 62d close the end faces of the cylinder 62a. The accumulator 64 supplies a refrigerant (for example, a refrigerant gas) to the cylinder 62a via the suction pipe 65.

The operation of the compressor 6 will be described below. The refrigerant supplied from the accumulator 64 is drawn by suction into the cylinder 62a through the suction pipe 65 fixed to the closed container 61. The electric motor 60 rotates through applying an electric current to an inverter, and thus the piston 62b fitted to the shaft 26 rotates in the cylinder 62a. With this operation, the refrigerant is compressed in the cylinder 62a.

The refrigerant ascends in the closed container 61 through the mufflers 62e. The compressed refrigerant is mixed with the freezer oil. As for the mixture of the refrigerant and the freezer oil, separation between the refrigerant and the freezer oil is accelerated upon their passage through air holes 36 formed in the rotor core, so that the freezer oil can be prevented from flowing into the discharge pipe 66. In this way, the compressed refrigerant is supplied to the high-pressure side of a refrigeration cycle through the discharge pipe 66.

As the refrigerant of the compressor 6, R410A, R407C, or R22, for example, can be used. The refrigerant of the compressor 6, however, is not limited to these examples. As the refrigerant of the compressor 6, a low-GWP (Global Warming Potential) refrigerant, for example, can be used.

As typical examples of the low-GWP refrigerant, the following refrigerants are available.
(1) An exemplary halogenated hydrocarbon having a carbon-carbon double bond in its composition is HFO-1234yf (CF3CF=CH2). HFO is an abbreviation of Hydro-Fluoro-Olefin. Olefin is an unsaturated hydrocarbon having only one double bond. The GWP of HFO-1234yf is 4.
(2) An exemplary hydrocarbon having a carbon-carbon double bond in its composition is R1270 (propylene). R1270 has a GWP of 3, which is lower than the GWP of HFO-1234yf, but R1270 is more flammable than HFO-1234yf.
(3) An exemplary mixture containing at least one of a halogenated hydrocarbon having a carbon-carbon double bond in its composition or a hydrocarbon having a carbon-carbon double bond in its composition is a mixture of HFO-1234yf and R32. Since HFO-1234yf is a low-pressure refrigerant and therefore causes a considerable pressure loss, it readily degrades the performance of the refrigeration cycle (especially in an evaporator). It is, therefore, desired to use a mixture with, for example, R32 or R41, which is a high-pressure refrigerant.

The compressor 6 according to Embodiment 2 has the effects described in Embodiment 1.

Using the electric motor 1 according to Embodiment 1 as the electric motor 60, the efficiency of the electric motor 60 can be improved, and the efficiency of the compressor 6 can be improved.

Embodiment 3

An air conditioner 50 (also called a refrigerating and air conditioning apparatus or a refrigeration cycle apparatus) according to Embodiment 3 of the present invention will be described below.

Figure 10:
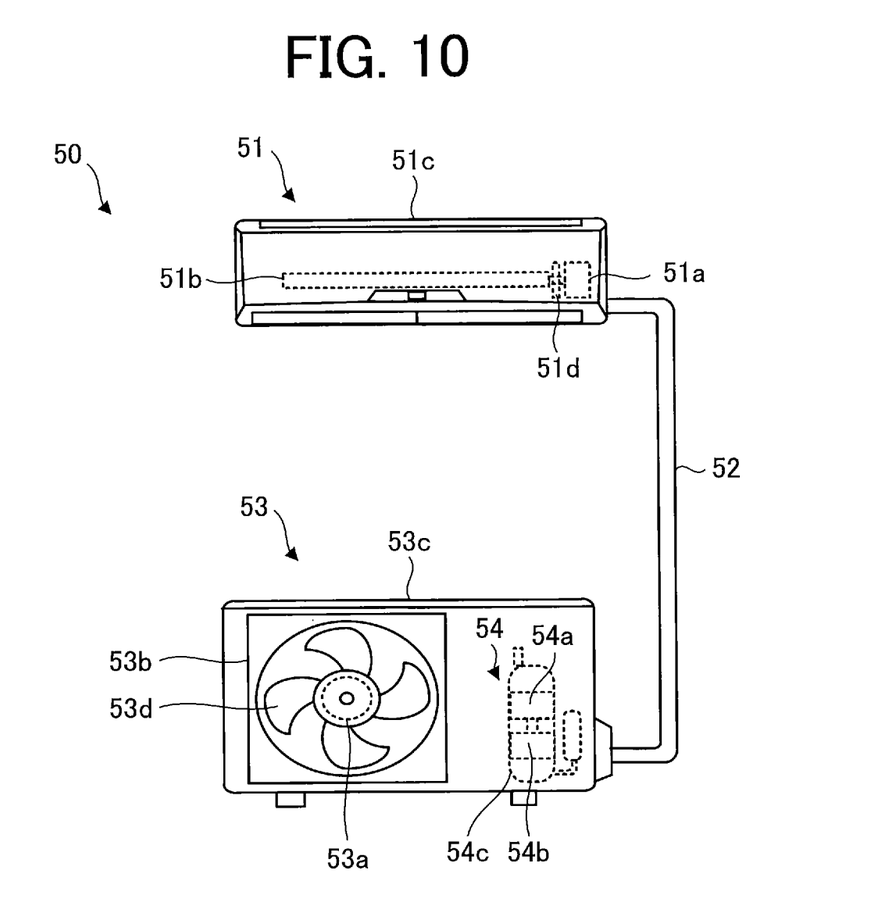
FIG. 10 is a diagram schematically illustrating a configuration of an air conditioner according to Embodiment 3.

FIG. 10 is a diagram schematically illustrating a configuration of the air conditioner 50 according to Embodiment 3.

The air conditioner 50 according to Embodiment 3 includes an indoor unit 51 as a fan (first fan), refrigerant piping 52, and an outdoor unit 53 as a fan (second fan) connected to the indoor unit 51 via the refrigerant piping 52.

The indoor unit 51 includes an electric motor 51a (for example, the electric motor 1 according to Embodiment 1), an air blower 51b driven by the electric motor 51a to blow air, and a housing 51c to cover the electric motor 51a and the air blower 51b. The air blower 51b includes, for example, blades 51d driven by the electric motor 51a. The blades 51d, for example, are fixed to a shaft (for example, the shaft 26) of the electric motor 51a and generate an air current.

The outdoor unit 53 includes an electric motor 53a (for example, the electric motor 1 according to Embodiment 1), an air blower 53b, a compressor 54, and a heat exchanger (not illustrated). The air blower 53b is driven by the electric motor 53a to blow air. The air blower 53b includes, for example, blades 53d driven by the electric motor 53a. The blades 53d, for example, are fixed to a shaft (for example, the shaft 26) of the electric motor 53a and generate an air current. The compressor 54 includes an electric motor 54a (for example, the electric motor 1 according to Embodiment 1), a compression mechanism 54b (for example, a refrigerant circuit) driven by the electric motor 54a, and a housing 54c to cover the electric motor 54a and the compression mechanism 54b. The compressor 54 is identical to, for example, the compressor 6 described in Embodiment 2.

In the air conditioner 50, at least one of the indoor unit 51 or the outdoor unit 53 includes the electric motor 1 described in Embodiment 1. More specifically, as a driving source for the air blower, the electric motor 1 described in Embodiment 1 is applied to at least one of the electric motors 51a or 53a. As the electric motor 54a of the compressor 54, the electric motor 1 described in Embodiment 1 may be used.

The air conditioner 50 can perform an operation such as a cooling operation for blowing cold air from the indoor unit 51, or a heating operation for blowing hot air from the indoor unit 51. In the indoor unit 51, the electric motor 51a serves as a driving source for driving the air blower 51b. The air blower 51b can blow conditioned air.

With the air conditioner 50 according to Embodiment 3, since the electric motor 1 described in Embodiment 1 is applied to at least one of the electric motors 51a or 53a, the same effects as those described in Embodiment 1 can be obtained. This makes it possible to improve the efficiency of the air conditioner 50.

Using the electric motor 1 according to Embodiment 1 as a driving source for a fan (for example, the indoor unit 51), the same effects as those described in Embodiment 1 can be obtained. This makes it possible to improve the efficiency of the fan. A fan including the electric motor 1 according to Embodiment 1 and blades (for example, the blades 51d or 53d) driven by the electric motor 1 can be solely used as an apparatus for blowing air. The fan is also applicable to apparatuses other than the air conditioner 50.

Using the electric motor 1 according to Embodiment 1 as a driving source for the compressor 54, the same effects as those described in Embodiment 1 can be obtained. This makes it possible to improve the efficiency of the compressor 54.

The electric motor 1 described in Embodiment 1 can be mounted not only in the air conditioner 50, but also in an apparatus including a driving source, such as a ventilating fan, a household electrical appliance, or a machine tool.

The features in the above-described embodiments can be combined together as appropriate.

What is claimed is:

1. An electric motor comprising:
   a rotor including a shaft, a rotor core fixed to the shaft, and a permanent magnet fixed to the rotor core; and
   a stator located outside the rotor and including a first stator core and a second stator core, the first stator core being located on a first side in an axial direction and including a first tooth extending in a radial direction, the second stator core being located on a second side opposite to the first side in the axial direction and being adjacent to the first stator core in the axial direction, wherein
   the shaft is supported only on the first side,
   a minimum distance from the rotor core to the first stator core in the radial direction is shorter than a minimum distance from the rotor core to the second stator core in the radial direction,
   a minimum distance from a rotation center of the rotor to the first stator core in the radial direction is shorter than a minimum distance from the rotation center of the rotor to the second stator core in the radial direction, and
   the first tooth comprises:
   a main body extending in the radial direction; and
   a first tooth end portion including a first portion extending in a circumferential direction and a second portion projecting from the first portion in the radial direction, wherein
   the first stator core comprises a second tooth extending in a radial direction, the second tooth being adjacent to the first tooth in the circumferential direction, wherein
   the second tooth comprises:
   a main body extending in the radial direction; and
   a second tooth end portion including a first portion extending in the circumferential direction and a second portion projecting from the first portion in the radial direction,
   the second stator core comprises a third tooth extending in a radial direction, and a fourth tooth extending in a radial direction, the fourth tooth being adjacent to the third tooth in the circumferential direction, wherein
   the third tooth comprises:
   a main body extending in the radial direction; and
   a third tooth end portion extending in the circumferential direction,
   the fourth tooth comprises:
   a main body extending in the radial direction; and
   a fourth tooth end portion extending in the circumferential direction, and
   in a plane perpendicular to the axial direction, a shape of a first-side slot opening between the first portion of the first tooth end portion and the first portion of the second tooth end portion is the same as a shape of a second-side slot opening between the third tooth end portion and the fourth tooth end portion, wherein
   in the plane perpendicular to the axial direction, a radius defined from the rotation center to the first portion of the first tooth end portion is equal to a radius defined from the rotation center to the third tooth end portion.

2. The electric motor according to claim 1, wherein in the plane perpendicular to the axial direction, a curvature of an inner circumferential surface of the first portion of the first tooth end portion is equal to a curvature of an inner circumferential surface of the third tooth end portion.

3. The electric motor according to claim 1, wherein in a plane perpendicular to the axial direction, a length of an inner circumferential surface of the first portion of the first tooth end portion is larger than 0.4 mm.

4. The electric motor according to claim 1, wherein in a plane perpendicular to the axial direction, a distance between both ends of an inner circumferential surface of the first portion of the first tooth end portion in a direction perpendicular to a radial direction is larger than a minimum width of the main body of the first tooth in a direction perpendicular to the radial direction.

5. The electric motor according to claim 1, wherein the permanent magnet is a rare-earth magnet.

6. The electric motor according to claim 1, further comprising a bearing supporting the first side of the shaft,
   wherein letting L1 be a minimum distance from an end of the second stator core on the second side to the bearing in the axial direction, M1 be a minimum distance from the first stator core to the bearing, N1 be a thickness of the first stator core in the axial direction, G1 be a minimum distance from the rotor core to the first stator core in the radial direction when the rotation center of the rotor coincides with a center of the stator in a plane perpendicular to the axial direction, and G2 be a minimum distance from the rotor core to the second stator core in the radial direction when the rotation center of the rotor coincides with the center of the stator in the plane,
   the electric motor satisfies $G2 \times (M1+N1)/L1 < G1 < G2$.

7. The electric motor according to claim 1, further comprising a bearing supporting the first side of the shaft,
   wherein letting $\theta 1$ be a maximum tilt of the shaft in a plane parallel to the axial direction, M1 be a minimum distance from the first stator core to the bearing, N1 be a thickness of the first stator core in the axial direction, G1 be a minimum distance from the rotor core to the first stator core in the radial direction when the rotation center of the rotor coincides with a center of the stator in a plane perpendicular to the axial direction, and G2 be a minimum distance from the rotor core to the second stator core in the radial direction when the rotation center of the rotor coincides with the center of the stator in the plane perpendicular to the axial direction,
   the electric motor satisfies $(M1+N1) \times \sin \theta 1 < G1 < G2$.

8. A compressor comprising:
   the electric motor according to claim 1;
   a compression mechanism driven by the electric motor; and
   a housing covering the electric motor and the compression mechanism.

9. A fan comprising:
   the electric motor according to claim 1; and
   a blade driven by the electric motor.

10. A refrigerating and air conditioning apparatus comprising:
    an indoor unit; and
    an outdoor unit connected to the indoor unit,
    at least one of the indoor unit or the outdoor unit including the electric motor according to claim 1.

* * * * *